Feb. 6, 1934.         F. KOCH, SR         1,945,642
FRUIT JAR LIFTER
Filed Feb. 21, 1933
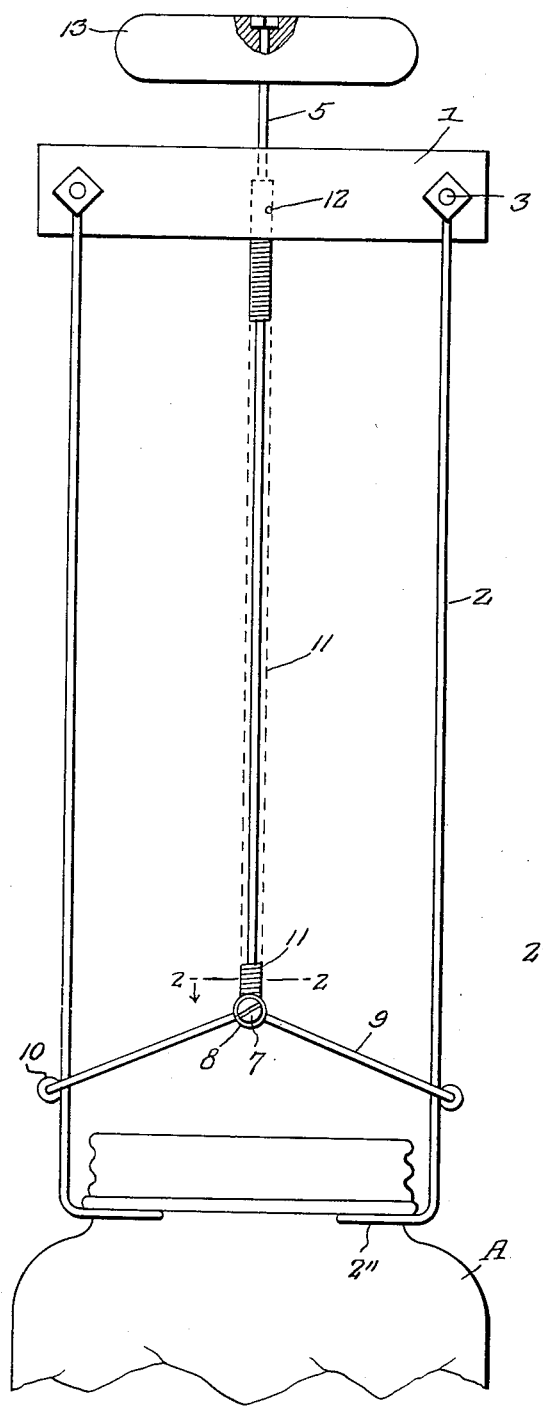
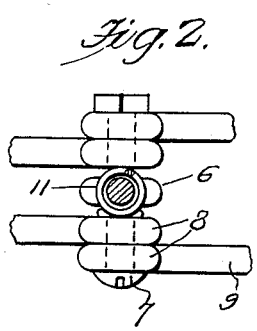
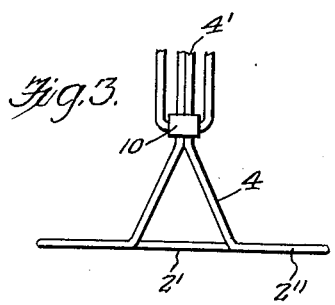
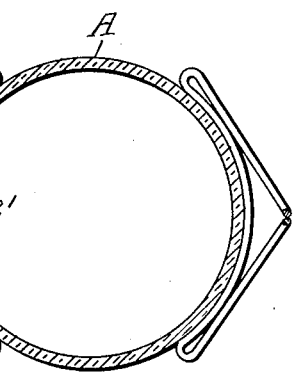
Inventor
Frank Koch, Sr.
By *Clarence A. O'Brien*
Attorney Patented Feb. 6, 1934

1,945,642

UNITED STATES PATENT OFFICE 1,945,642

FRUIT JAR LIFTER

Frank Koch, Sr., Albion, Nebr.

Application February 21, 1933. Serial No. 657,867

2 Claims. (Cl. 294—115)

This invention relates to a device for lifting fruit jars and the like, the general object of the invention being to provide a support having a pair of jaws pivoted thereto, with means for spreading the jaws apart and spring means for closing the jaws, with the parts so formed that the weight of the jar acts to hold the jaws in gripping relation thereon.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view showing the invention in use.

Figure 2 is a section on line 2—2 of Figure 1.

Figure 3 is a detail side view showing a jaw part and the means for pivoting a loop member thereto.

Figure 4 is a transverse sectional view showing how the jaws grip the jar.

In this drawing, the numeral 1 indicates a cross piece which has a jaw member 2 pivotally connected to each end thereof, as shown at 3. Each jaw member is preferably formed from a single length of wire bent at its center to provide the arcuate gripping part 2', the converging parts 2'', connected with the ends of the part 2', the converging parts 4 extending upwardly from the inner ends of the parts 2'' and from these parts 4 the two portions of the wire extend upwardly, as shown at 4', with their ends pivoted to the member 1, as shown at 3. As will be seen from Figures 1, 3 and 4, the formation of the gripping portions of the two jaw members will enable these parts to grip a jar A, as shown in Figures 1 and 4.

A rod 5 passes through a hole in the center part of the member 1 and extends downwardly and has its lower end formed with an eye 6 for receiving a bolt 7 which also extends through the eyes 8 formed at the extremities of the limbs of the loops or U-shaped members 9. The bights of these members 9 pass through the small sleeves 10 suitably fastened to the lower portions of the stems of the jaw members 2. A spring 11 encircles the rod 5 and has one end inserted in a socket in the member 1, with an end of the wire spring connected to the member 1, as shown at 12, and the other end of the spring is connected with the bolt 7. This spring tends to move the parts upwardly and thus cause the U-shaped members 9 to move the jaws toward each other so as to grip a jar or other object, as shown in Figure 1. A handle 13 is fastened to the upper end of the rod and by pressing this handle toward the member 1, the rod will be pushed downwardly against the action of the spring 11, so that the members 9 will be spread apart and thus the jaw members will be spread apart, to enable the device to be placed in engagement with a jar or other object. Then by releasing the pressure, the spring 11 will return the parts to gripping position and as will be seen, the heavier the load on the jaw members, the greater will be the gripping action.

Thus I have provided a simple device for lifting and carrying hot jars or the like, the device being easily and quickly connected to a jar or released therefrom.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a cross piece, a pair of jaw members having the upper ends of their stems pivotally connected to the cross piece, one adjacent each end thereof, jaws extending inwardly from the lower ends of the stems, a rod passing through the central part of the cross piece, a bolt connected with the lower end of the rod, substantially U-shaped members having their inner ends pivotally connected with the bolt, sleeves connected to the lower portions of the stems and through which the bight portions of the U-shaped members pass, a spring encircling the rod and having one end connected to the point of connection of the rod with the U-shaped members and its other end connected with the cross piece, and a handle on the upper end of the rod.

2. A device of the class described comprising a cross piece, a pair of jaw members, each consisting of a stem and a jaw, composed of a single piece of material having its central part of arcuate shape to form an object engaging part, with portions of the material extending from the ends of said arcuate shaped part toward each other, with the rest of the material extending upwardly to form a two-piece stem, means for pivotally connecting the upper end of each stem to the cross piece adjacent an end of the cross piece, sleeves connected to the lower part of the two stems, a pair of U-shaped members having their bight parts passing through the sleeves, a rod passing downwardly through the central part of the cross piece, a bolt connected to the lower end of the rod and the inner ends of the U-shaped members having eyes thereon engaging the bolt, a spring encircling the rod and having one end connected with the bolt and its upper end to the cross piece and a handle connected to the upper end of the rod.

FRANK KOCH, Sr.